INVENTORS: W. H. T. HOLDEN
R. P. JUTSON
J. L. LAREW

BY Wayne B Wells
ATTORNEY

Patented Oct. 24, 1933

1,931,867

UNITED STATES PATENT OFFICE 1,931,867

BATTERY CONTROL SYSTEM

William H. T. Holden, Brooklyn, and Robert P. Jutson, Yonkers, N. Y., and Joel L. Larew, South Amboy, N. J.; said Holden assignor to American Telephone and Telegraph Company, a corporation of New York, and said Larew and Jutson assignors to Bell Telephone Laboratories, Incorporated, New York, N. Y., a corporation of New York Application August 13, 1930. Serial No. 475,066

21 Claims. (Cl. 171—314)

This invention relates to power supply systems and particularly to power supply systems having storage batteries included therein.

One object of the invention is to provide a power supply system under normal operating conditions having a portion of a storage battery floated across a source of current connected to a load circuit and upon failure of the source of current having the complete battery connected to the load circuit while insuring against change of the load circuit voltage.

Another object of the invention is to provide a power supply system that shall have a battery floated between a source of current and a load circuit while varying an impedance in series with the battery to control the charging operation and that shall reduce the current from said source and exclude a portion of the battery and the impedance from circuit when the battery is charged.

A further object of the invention is to provide a power supply system that shall have a portion of a battery floating between a source of current and a load circuit and upon failure of the source connect the complete battery to the load circuit while maintaining the load circuit voltage constant and that shall charge the complete battery upon energization of the source by increased current from the source until the battery is charged to a predetermined point when the charging current is reduced and a portion of the battery excluded from circuit while maintaining the load circuit voltage constant.

In supplying power for many purposes it is desired and in some cases essential to maintain the power supply uninterrupted and to maintain the voltage of the supplied power substantially constant. The system described hereinafter is particularly adapted for supplying power to the plate circuits of space discharge tubes although not limited to such purpose.

The system employed to disclose the invention comprises two storage batteries divided into sections and having one section of each battery floating between a source of current and a load circuit. The source of current comprises rectifying means connected to an alternating current power circuit. When the batteries are fully charged, the voltage of the current supplied by the rectifiers to the load circuit and the batteries is controlled by means of a voltmeter relay connected across the load circuit. The voltmeter relay controls relays which govern a resistance element in the output circuit of the rectifying means. The voltmeter relay may be set to operate at any desired voltage. In the disclosed system the relay operates at 131 volts and 135 volts. The battery sections floated across the rectifier output circuits are assumed to discharge at a very slow rate when the resistance element is in the rectifier output circuit and to be charged at a slow rate when the resistance element is shunted out of the rectifier output circuit.

In case the power source connected to the rectifiers fails, automatic means is provided for connecting the complete batteries in parallel to the load circuit. When the complete batteries are connected to the load circuit counter electro motive force battery cells shunted by a resistance element are connected in series with the main batteries to prevent an abrupt rise in the load circuit voltage. The resistance element in shunt with respect to the counter electromotive force battery cells is controlled by the voltmeter relay for maintaining the voltage on the load circuit substantially constant.

Upon re-energization of the rectified power circuit, automatic means is provided for increasing the rectified current supplied to the complete batteries in order to overcharge the batteries. During the charging operation the voltmeter relay controls a resistance element in shunt and in series with respect to the counter electromotive force cells to maintain the load circuit voltage substantially constant. When the battery is fully charged, an ampere hour meter serves to control means for reducing the charging current and for excluding battery sections from the circuit. Furthermore the counter electromotive force battery cells shunted by the resistance element are excluded from the battery circuit and the voltmeter relay again controls the resistance element in the rectifier output circuit to maintain the load circuit voltage substantially constant.

Fig. 1 in the accompanying drawings is a diagrammatic view of a battery control system constructed in accordance with the invention.

Figure 1:
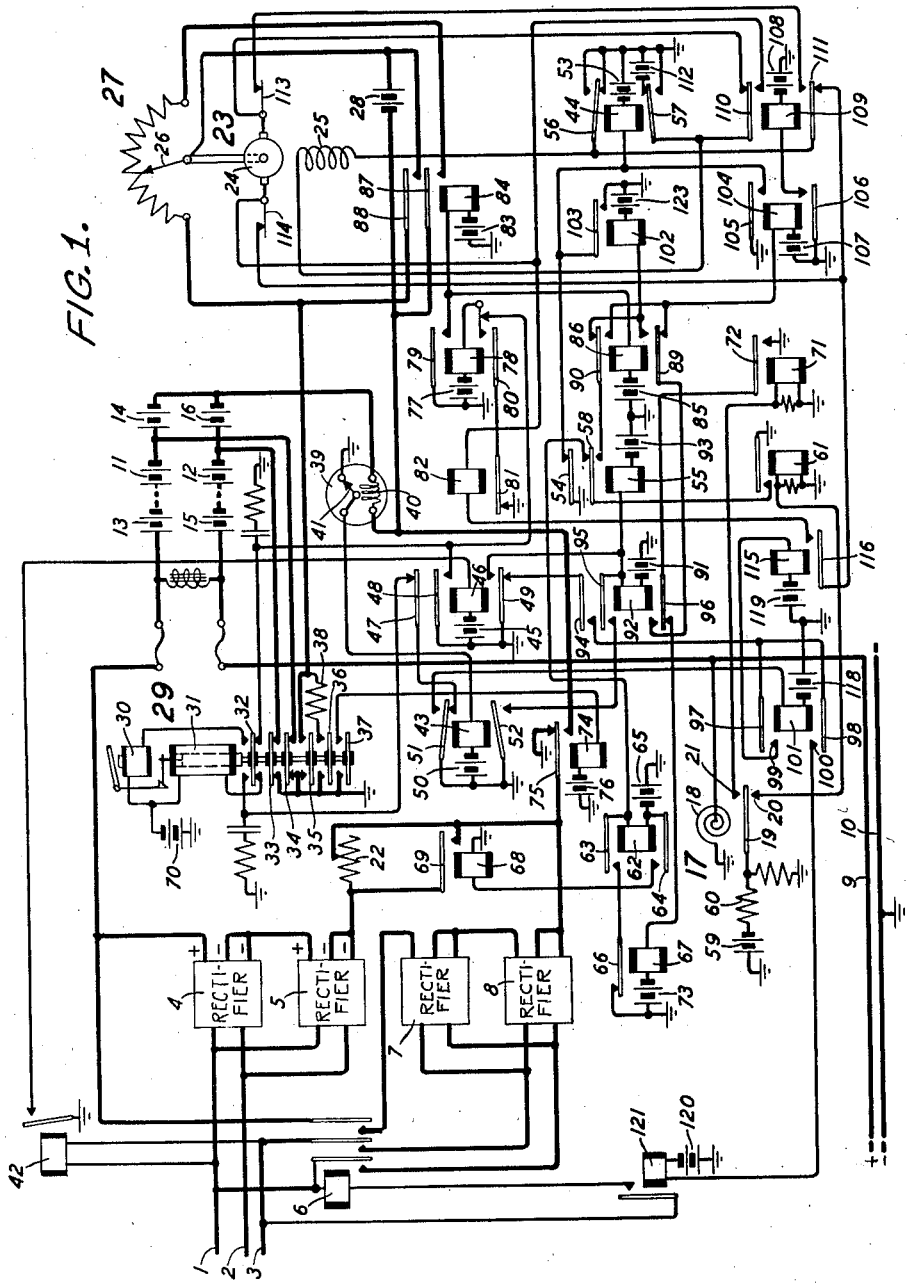

Referring to the drawings, an alternating-current power circuit comprising conductors 1, 2 and 3 is connected to rectifiers 4 and 5 of any suitable type. A switch 6 is provided for connecting the alternating power circuit to rectifiers 7 and 8 under certain charging operations. The rectifiers 4 and 5 supply power to a load circuit comprising conductors 9 and 10 and to two batteries 11 and 12. The battery 11 is divided into sections 13 and 14 and the battery 12 is divided into sections 15 and 16. Under normal operating conditions the sections 13 and 15 of the batteries 11 and 12 are floated across the circuit connections between the rectifiers 4 and 5 and the load conductors 9 and 10. Upon failure of the alternating-current power supply and under certain operating conditions both sections of batteries 11 and 12 are connected to the load conductors.

A voltmeter relay 17 comprising an energizing coil 18 and a contact arm 19 which is adapted to engage contact members 20 and 21 is provided for controlling a resistance element 22 in the output circuit of the rectifiers 4 and 5 in accordance with the voltage across the load conductors 9 and 10. The voltmeter relay also controls a motor 23 comprising an armature 24 and a field winding 25. The motor 23 controls the arm 26 of a rheostat 27. The rheostat 27 is placed in parallel or in series with counter electromotive force cells 28 which are inserted in circuit with the batteries 11 and 12 under certain operating conditions as will be described hereinafter.

Figure 5:
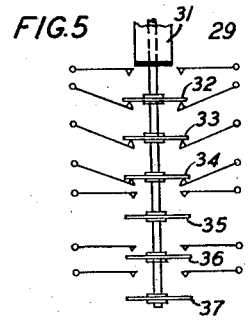
Fig. 5 is a diagrammatic view of the end cell switch in released position.
Figure 6:
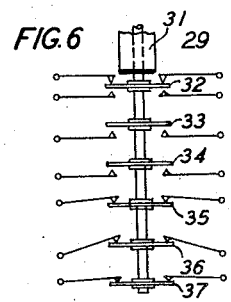
Fig. 6 is a diagrammatic view of the end cell switch in operative position.

An end cell switch 29 is provided for controlling the connection of the batteries 11 and 12 across the load conductors 9 and 10. The end cell switch comprises two coils 30 and 31 and switch members 32 and 37 inclusive. The end cell switch is shown in released position in Figs. 1 and 5 of the drawings and in operative position in Fig. 6.

An ampere hour meter 39 comprising a coil 40 and a switch member 41 is inserted in the battery circuit upon failure of the alternating-current power for measuring the power supplied by the batteries to the load conductors. The ampere hour 39 serves to limit the charging of the batteries 11 and 12 when the alternating-current power is returned after a failure thereof.

Assuming the batteries 11 and 12 to be fully charged and the sections 13 and 15 to be connected across the load conductors and the voltmeter relay to be in the position shown on the drawings then relays 42, 43 and 44 will be operated. The coil of the relay 42 is connected across the alternating power supply conductors 1 and 3 and is released upon failure of the alternating-current power. The relay 42 upon release thereof completes a circuit from a battery 45 through the coil of relay 46. The relay 46 is provided with switch members 47, 48 and 49. The relay 43 is energized by a circuit extending from battery 50 through the contact arm 41 of the ampere hour meter 39. Relay 43 is provided with two switch members 51 and 52. The relay 44 is energized by a circuit extending from a battery 53 through the coil of the relay and a switch member 54 of a relay 55. Relay 44 is provided with switch members 56 and 57. The relay 55 is provided with a second circuit switch member 58.

In the case under consideration the switch arm 19 of the voltmeter relay is assumed to be in central position and resistance element 22 in the output circuit of the rectifiers 4 and 5. Under such conditions the charging current supplied to the batteries will be a little less than the load and the batteries will slowly discharge. When the batteries have discharged to a point such, for example, that the load circuit voltage is reduced to 131 volts, the contact arm 19 of the voltmeter relay will engage the contact member 20. Thereupon a circuit is completed from grounded battery 59 through resistance element 60, switch arm 19, contact member 20, and coil of a relay 61 to ground return. The relay 61 is operated and completes a circuit through the coil of a relay 62. Relay 62 is provided with switch members 63 and 64. The energizing circuit for the relay 62 may be traced from grounded battery 65 through the coil of the relay 62, switch member 58 of the relay 55 and switch member of the relay 61 to ground return. The switch member 63 of the relay 62 establishes a holding circuit for the relay through a switch member 66 of a relay 67. The switch member 64 of the relay 62 establishes a circuit from the battery 65 for operating a relay 68. Relay 68 is provided with a switch member 69 which serves to short circuit the resistance 22 in the output circuit of the rectifiers 4 and 5.

When the resistance element 22 is excluded from the rectifier output circuit the charging rate is increased to a value, for example, two amperes greater than the load. The battery sections 13 and 15 now start to rise in voltage due to the light charge they are receiving and the voltage on the load conductors 9 and 10 is raised. When the upper limit which, for example, may be 135 volts is reached, the arm 19 of the voltmeter relay 17 is moved into engagement with contact member 21. When the voltmeter relay arm 19 is moved into engagement with the contact member 21, the relays 62 and 68 are held in operated position by reason of the holding circuit for the relay 62 which is completed through the switch arm 66 of the relay 67.

Figure 2:
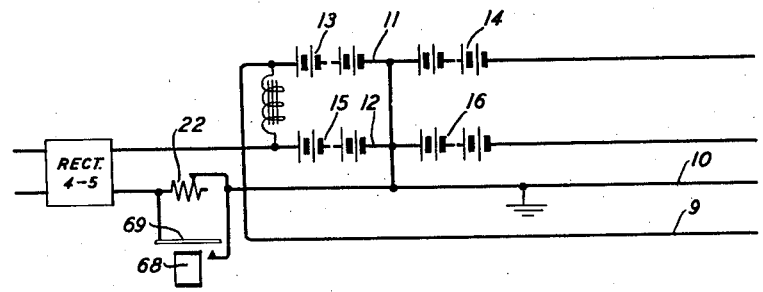
Fig. 2 is a diagrammatic view showing the connection of the batteries to the alternating current source during normal operation.

The engagement of the voltmeter relay arm 19 with the contact member 21 completes a circuit from the grounded battery 59 for operating a relay 71. The relay 71 is provided with a switch member 72 which completes a circuit for operating the relay 67 from a grounded battery 73. Upon operation of the relay 67 the holding circuit for the relay 62 is opened to release the relays 62 and 68 and insert the resistance element 22 in the output circuit of the rectifiers 4 and 5. Upon removal of the short circuit around the resistance element 22 the charging rate of the batteries is reduced, for example, to a value approximately 2 amperes below the load. The above operation under the control of the voltmeter relay 17 is continued to maintain the voltage on the load conductors 9 and 10 within the limits of 131 and 135 volts. The circuit of the batteries during regulation by means of the resistance element 22 is diagrammatically illustrated in Fig. 2 of the drawings.

If the alternating-current power supplied by the conductors 1, 2 and 3 to the rectifiers 4 and 5 fails, then the relay 42 is released for completing a circuit from the grounded battery 45 to operate the relay 46. The switch member 48 of the relay 46 completes a circuit from grounded battery 70 through the coil 31 for effecting operation of the relay 29. The relay 29 serves to connect both sections of the batteries 11 and 12 in parallel across the load conductors 9 and 10. Under normal conditions the battery sections 13 and 15 are connected across the load conductors by means of the switch members 33 and 34 of the end cell switch 29. Upon energization of the coil 31 the switch member 36 is moved into engagement with its associated contact members while the switch members 33 and 34 are still in engagement with their associated contact members. The engagement between the switch member 37 and the associated contact member completes a circuit from the negative terminal of the batteries 11 and 12 through a resistance element 38 to ground. Further movement of the end cell switch 29 separates the switch members 33 and 34 from the associated contact members and finally the switch member 35 and 37 engage their associated contact members and the switch member 32 engages the upper pair of its associated contact members. In such position of the end cell switch, a suitable latch which is released by the coil 30 is provided for holding the switch members in the position to which they have been moved. The end cell switch 29 is shown in operative position in Fig. 6 of the drawings.

The end cell switch 29 connects the counter electro-motive cells 28 shunted by the rheostat 27 in circuit with the batteries 11 and 12. This circuit will be described more fully hereinafter. The end cell switch 29 also completes a circuit from grounded battery 76 for operating a transfer relay 74. Transfer relay 74 is provided with a switch member 75 which performs no useful operation until the alternating-current source of supply is again furnished to the rectifiers 4 and 5.

The switch member 48 of the relay 46 also completes a circuit from a grounded battery 77 for operating a relay 78. The relay 78 is provided with switch members 79 and 80. The operation of the switch member 80 serves to establish a holding circuit for the energizing coil of the relay 78 through a switch member 81 of relay 82. Switch member 79 upon operation of the relay 78 completes a circuit from a grounded battery 83 for operating a relay 84 and a circuit from a grounded battery 85 for operating a relay 86. The relay 84 is provided with switch members 87 and 88 and relay 86 is provided with switch members 89 and 90. The relay 84 cooperating with the end cell switch 29 connects the counter E. M. F. cells 28 shunted by the rheostat 27 in series with the ampere hour meter 39 and the batteries 11 and 12.

The switch member 49 of the relay 46 completes a circuit from grounded battery 91 for operating the relay 92 and completes a circuit from grounded battery 93 for operating the relay 55. Relay 92 is rovided with switch members 94, 95 and 96. The switch member 94 of the relay 92 places ground on switch members 97 and 98 which are adapted to engage contact members 99 and 100 upon operation of a relay 101. The switch member 96 of the relay 92 transfers control by the relay 71 from the relay 67 to a relay 102. Relay 102 is provided with a switch member 103. The control of the relay 71 is transferred to the relay 102 inasmuch as the relay 86 is operated by the relay 78. The switch member 58 of the relay 55 transfers control by the relay 61 from the relay 62 to a relay 104. The relay 104 is provided with two switch members 105 and 106. The relays 92 and 55 transferring the control of the relays 61 and 71, serve, as will be hereinafter more clearly described, to transfer the control of the voltmeter relay 17 from the resistance element 22 in the output circuit of the rectifiers 4 and 5 to the motor 23 which governs the operation of the rheostat 27.

The circuit connecting the batteries 11 and 12 across the load conductors 9 and 10 may be traced from the load conductor 9 through the batteries 11 and 12 in parallel, coil 40 of the ampere hour motor 39, counter electromotive force cells 28 and the rheostat 27 in parallel through the switch members 87 and 88 of the relay 84, switch member 35 and ground return to the load conductor 10. The counter electromotive cells 28 shunted by the rheostat 27 are inserted in circuit with the batteries 11 and 12 in order to insure against a sudden increase in voltage on the load conductors 9 and 10.

The batteries 11 and 12 start to discharge and when the voltage on the load conductors 9 and 10 is reduced to the lower limit of 131 volts, the switch arm 19 engages the contact member 20 for completing a circuit from the grounded battery 59 to operate the relay 61. The relay 61 completes a circuit from the grounded battery 107 through the coil of the relay 104, switch member 90 of the relay 86, switch member 58 of the relay 55 and the switch member of the relay 61 to ground. When relay 104 is operated, switch member 105 completes a circuit for operating relay 44 from grounded battery 53. Switch member 106 completes a circuit from grounded battery 108 for operating a relay 109. Relay 109 is provided with switch members 110 and 111. The relays 109 and 44 complete circuit for operating the motor 23 so as to move the switch arm 26 of the rheostat 27 in a clockwise direction. The circuit through the field winding 25 of the motor 23 extends from one terminal of a battery 112 through switch member 56, field winding 25, and switch member 57 to the other terminal of the battery 112. The circuit through the armature 24 of the motor 23 may be traced from one terminal of the battery 12 through the switch member 56, switch member 111, limit switch 113, armature 24, switch member 110 and switch member 57 to the other terminal of the battery 112.

A right limit switch 114 controlled by the operation of the rheostat arm 26 is not included in the motor circuit at this time. Before the switch arm 26 of the rheostat 27 starts to travel in a clockwise direction, it is assumed the right limit switch 114 is in open position. The open position of the right limit switch 114 at this time does not permit operation of the relay 82 which controls the holding circuit through the relay 78 inasmuch as the circuit through the coil of the relay 82 is held in open position by means of a relay 115. Relay 115 is provided with a switch member 116. Switch member 116 is included in the circuit of the coil for the relay 82. The operation of the relay 82 through the right limit switch 114 will be described hereinafter.

Figure 3:
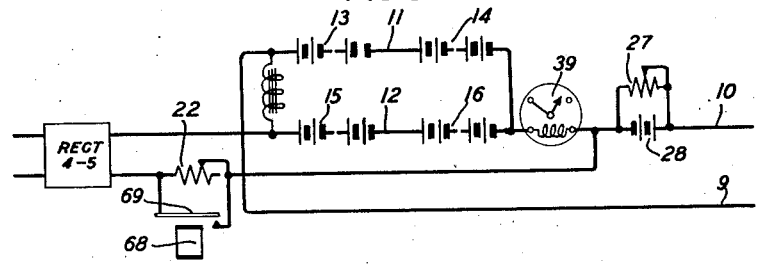
Fig. 3 is a diagrammatic view showing one connection of the batteries with respect to the counter electromotive force cells.

The operation of the motor 23 by the relays 109 and 44 under the control of the voltmeter relay 17 serves to reduce the amount of resistance of the rheostat 27 which is shunted across the counter electromotive force cells 28. The rheostat 27 in parallel with the counter electromotive force cell 28 divides the current with the cells until all available current to the load is flowing through the rheostat. When the voltage on the load conductors 9 and 10 is raised, the voltmeter relay is operated to stop the operation of the rheostat motor 23. The intermittent operation of the rheostat motor 23 under the control of the voltmeter relay 17 will continue until the entire resistance in shunt of the counter electromotive cells 28 is excluded from the circuit. It is assumed that the rectifier power supply will be returned by the time the complete resistance has been excluded from the circuit. Fig. 3 of the drawings shows the circuit of the batteries when the rheostat 27 is connected in parallel with the counter electromotive force cells 28.

When the batteries 11 and 12 are being discharged, the ampere hour meter 39 moves its switch arm 41 so as to break the energizing circuit for the relay 43 completed from the grounded battery 50. The switch member 52 upon release of the relay 43 serves to establish holding circuits for the relays 92 and 55. The switch member 51 upon release of the relay 43 operates the relay 101 from a grounded battery 118. The operation of the relay 101 performs no useful function at this time inasmuch as the relay 46 is operated by reason of the relay 42 being in a released position.

Assuming power is returned to the supply conductors 1, 2 and 3, the relay 42 is operated to break the energizing circuit for the relay 46. Upon the release of the relay 46, circuits are completed through the switch members 97 and 98 of the relay 101. The switch member 97 of the relay 101 operates the relay 115 from a grounded battery 119. The switch member 98 of the relay 101 completes a circuit from a grounded battery 120 for operating a relay 121. The relay 121 operates the relay 6 for connecting the rectifiers 7 and 8 in circuit with the batteries 11 and 12 so that the batteries may be charged at an increased rate.

The battery voltage starts to increase as also the voltage across the load conductors 9 and 10. When the upper limit of 135 volts is reached on the load conductors 9 and 10, the voltmeter relay 17 is operated to effect engagement between the switch member 19 and the contact member 21. The relay 71 is operated from the grounded battery 59. The switch member 72 of the relay 71 effects operation of the relay 102. The circuit for operating the relay 102 extends from ground through the switch member 72, switch member 96 of the relay 92, switch member 89 of relay 86 and the coil of the relay 102 to a grounded battery 123. The relay 102 by means of switch member 103 completes a circuit from the grounded battery 53 for operating the relay 44. The relay 44 completes circuits from the battery 112 through the field winding 25 and the armature 24 of the rheostat motor 23. The relative directions of current flow through the field winding in the armature is reversed with respect to the operation described heretofore in order to effect operation of the motor in a reverse direction and to effect movement of the rheostat arm 26 in a counter clockwise direction.

Figure 4:
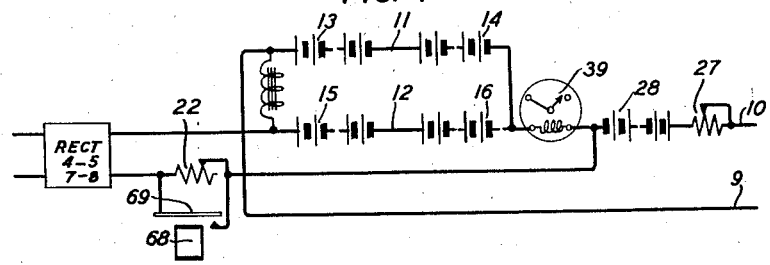
Fig. 4 is a diagrammatic view showing another connection of the batteries during charging thereof at a high rate.

The rheostat arm 26 inserts more resistance in parallel with the counter electromotive cells 28 and consequently increases the impedance to the current flow from the batteries 11 and 12. The operation of the rheostat motor 23 under the control of the voltmeter relay 17 is repeated until the contact arm 26 has moved to the end of its travel in a counter clockwise direction. At the end of the counter clockwise movement of the rheostat arm 26, the right limit switch 114 is opened. When the right limit switch 114 is opened, the next operation of the voltmeter relay upon high voltage obtaining on the load circuit conductors will operate the relays 71, 102 and 44 as described heretofore. However, the current supplied to the armature 24 of the rheostat motor 23 from battery 112 will extend through the switch member 116 of the relay 115 and the operating coil of the relay 82. The relay 82 will be operated to break the holding circuit for the relay 78. The relay 78 is released and in turn releases the relays 84 and 86. The release of the relay 84 breaks the parallel connection between the counter electromotive cells 28 and the rheostat 27 and connects the rheostat 27 in series with the two batteries 11 and 12 and the counter electromotive force cells 28. The release of the relay 86 transfers the control circuit of the voltmeter relay 17 so that upon the next operation of the voltmeter relay when high voltage obtains on the load conductors 9 and 10 the rheostat motor 23 will be operated in a direction to effect clockwise movement of the rheostat arm 26. Thus if high voltage obtains on conductors 9 and 10, the voltmeter relay 17 is operated to effect engagement between the contact arm 19 and contact member 21. The relay 71 is operated from the grounded battery 59. The switch member 72 of the relay 71 completes a circuit through the switch member 96 of the relay 92 and the switch member 89 of the relay 86 for operating the relay 104. Relay 104 completes circuits for operating the relays 109 and 44. The relays 109 and 44 complete circuits from the battery 112 through the field winding 25 and the armature 24 of the rheostat motor 23 for operating the rheostat arm 26 in a clockwise direction. The clockwise movement of the rheostat arm 26 increases the resistance or impedance in series with the batteries 11 and 12. The rheostat arm 26 is intermittently operated in a clockwise direction by the motor 23 under the control of the voltmeter relay 17 to maintain the voltage across the load conductors 9 and 10 substantially constant. Fig. 4 of the drawings shows the circuit of the batteries when the rheostat 27 is connected in series with the counter electromotive force cells 28 during charging of the batteries at a high rate.

When the batteries 11 and 12 have reached their full charge the contact arm 41 of the ampere hour member 39 will be moved into engagement with the grounded contact member to complete a circuit from the grounded battery 50 and operate the relay 43. The operation of the relay 43 will break the holding circuits for the relays 92 and 55 which relays in turn return all control relays to normal position. The relay 43 also breaks the holding circuit for the relay 101 which in turn releases the relay 121. Relay 121 releases the relay 6 to disconnect the rectifiers 7 and 8 from the batteries 11 and 12 and the load conductors 9 and 10. The contact member 51 of the relay 43 completes a circuit from the grounded battery 70 through the coil 30 of the end cell switch 29. The coil 30 of the end cell switch operates a latch for releasing the end cell switch to permit its return to normal position. The return of the end cell switch 29 to normal position excludes the counter E. M. F. cells 28 and the rheostat 27 from circuit. The voltmeter relay 17 now controls the charging of the battery sections 13 and 15 and the voltage on the load conductors 9 and 10 by controlling the shunt circuit around the resistance element 22 in the output circuit of the rectifiers 4 and 5. When it the batteries are connected for normal operation, the relay 44 is operated and the relay 109 is released to complete a circuit through the motor 23 for returning the rheostat arm 26 to its extreme position towards the left as viewed in Fig. 1 of the drawings. The return movement of the rheostat arm is stopped by opening of the switch 114.

Modifications in the system and in the arrangement and location of parts may be made within the spirit and scope of the invention and such modifications are intended to be covered by the appended claims.

What is claimed is:

1. In a battery control system, a source of charging current, a storage battery divided into sections, means for floating one section of the battery between the source and a load circuit and for automatically regulating the voltage of the current supplied by the source in accordance with the load circuit voltage to maintain the load circuit voltage constant, and means automatically operated, upon failure of the source, for connecting the complete battery to the load circuit and for insuring against a sudden increase in voltage on the load circuit.

2. In a battery control system, a source of charging current, a battery divided into sections, means for floating one section of the battery between said source and a load circuit, impedance means, means upon failure of said source for automatically connecting the complete battery to the load circuit in series with said impedance means to insure against a sudden increase in voltage on the load circuit, and means for automatically varying said impedance means according to the load circuit voltage to maintain the load circuit voltage constant.

3. In a battery control system, a source of charging current, a battery divided into sections, means for floating one section of the battery between said source and a load circuit, impedance means, means upon failure of said source for automatically connecting the complete battery in series with said impedance means to the load circuit to insure against a sudden increase in voltage on the load circuit, means automatically controlled by the load circuit voltage for gradually reducing said impedance means to maintain constant voltage on the load circuit, and means automatically operated upon energization of said source for increasing the charging current supplied to the battery and for gradually increasing the value of said impedance means in circuit to maintain the voltage on the load circuit constant.

4. In a battery control system, a source of charging current, a battery connected between said source and a load circuit, impedance means between said battery and the load circuit, control means for automatically varying said impedance means according to the load circuit voltage to maintain the load circuit voltage constant, and means automatically operated when the battery is charged to a predetermined point for simultaneously reducing the charging current and excluding all said impedance means from circuit.

5. In a battery control system, a source of charging current, a battery divided into sections and connected between said source and a load circuit, impedance means between said battery and the load circuit, control means for automatically varying said impedance means according to the load circuit voltage to maintain the load circuit voltage constant, and means automatically operative when the battery is charged for reducing the charging current and for excluding a portion of the battery and the impedance means from circuit.

6. In a battery control system, a source of charging current, a battery connected between said source and a load circuit, impedance means between said battery and the load circuit, control means for automatically varying said impedance means according to the load circuit voltage to maintain the load circuit voltage constant, means automatically operative when the battery is charged to a predetermined point for reducing the charging current and for excluding the impedance means from circuit, a resistance means connected between said source and the battery and means automatically governed in accordance with the load circuit voltage when the battery is charged and said impedance means is excluded from circuit for controlling said resistance means to maintain the load circuit voltage constant.

7. In a battery control system, an alternating current supply circuit, a rectifier connected to said supply circuit, two storage batteries each comprising two sections, means for connecting one section of each battery in parallel between a load circuit and said rectifier and for regulating the voltage of the current supplied to said battery section, and means, upon failure of said supply circuit, for connecting the complete batteries to the load circuit and for insuring against a sudden increase in voltage on the load circuit.

8. In a battery control system, a battery charging source of current, two batteries each comprising two sections, means for floating one section of each battery in parallel between said source and a load circuit, and means, upon failure of said source, for connecting the complete batteries in parallel to the load circuit, for opposing the voltage of the complete batteries to prevent an increase in voltage on the load circuit, and for gradually reducing the opposition to the batteries to maintain the voltage on the load circuit substantially constant.

9. In a battery control system, a battery charging source of current, two batteries each comprising two sections, means for connecting one section of each battery in parallel between said source and a load circuit, means upon failure of said source for connecting the complete batteries in parallel to the load circuit, means for opposing the voltage of the complete batteries to prevent an increase in voltage on the load circuit upon connecting the complete batteries in parallel with the load circuit, and means for gradually reducing the opposition to the batteries to maintain the voltage on the load circuit substantially constant, and means for overcharging the complete batteries connected in parallel between said source and the load circuit and for gradually increasing the opposition to the batteries during charging to maintain the voltage on the load circuit constant.

10. In a battery control system, two batteries connected in parallel to a load circuit, each of said batteries being divided into sections, impedance means in circuit between said batteries and the load circuit, means controlled by the voltage on the load circuit for governing said impedance means to maintain the voltage on the load circuit substantially constant, a source of current for charging said batteries, means for connecting said batteries in parallel between said source and said impedance means to charge the batteries while varying said impedance means to maintain the voltage on the load circuit constant, and means automatically controlled according to the battery charge for excluding a section of each battery and said impedance means from circuit and for reducing the charging current.

11. In a battery control system, a battery divided into sections and connected to a load circuit, impedance means comprising counter electromotive force cells and a resistance element in shunt to the cells connected between the battery and the load circuit, control means automatically governed according to the voltage on the load circuit for reducing said resistance to maintain the load circuit voltage constant, a source of current for charging said battery, means for connecting said battery between the load circuit and said source while varying said control means to maintain the voltage on the load circuit constant, and means automatically operative when the battery is charged for reducing the charging current and for excluding a portion of the battery, the counter electromotive force cells and the resistance element from circuit.

12. In a battery control system, a battery divided into sections and connected to a load circuit, impedance means connected between the battery and the load circuit and comprising counter electromotive force cells in parallel with a resistance element, control means automatically governed according to the voltage on the load circuit for varying said resistance element to maintain the voltage on the load circuit constant, a source of current for charging said battery, means for connecting said battery between the source and the load circuit while operating said control means to maintain the load circuit voltage constant, means automatically operative, when the impedance means is charged a predetermined amount, for connecting said cells and resistance element in series and for varying said control means to maintain the load circuit voltage constant, and means comprising an ampere hours meter in the battery circuit operative when the battery is charged for reducing the charging current and for excluding a portion of the battery and the impedance means from circuit.

13. In a battery control system, a source of charging current, an ampere hour meter, a battery divided into sections, the sections of said battery being connected in series with said meter across the output of the source between said source and a load circuit, and means controlled by said meter when the battery is charged a predetermined amount for reducing the charging current and for excluding a portion of the battery from circuit.

14. In a battery control system, a source of charging current, variable impedance means, an ampere hour meter, a battery connected in series with said meter across the output circuit of said source, said impedance means being connected in series with a load circuit across the output circuit of said source, control means for automatically varying said impedance means according to the load circuit voltage to maintain the load circuit voltage constant during charging of the battery, and means controlled by said meter when the battery is charged a predetermined amount for reducing the charging current and for excluding the impedance means from circuit.

15. In a battery control system, a source of charging current, variable impedance means, an ampere hour meter, a battery divided into sections and connected in series with said meter across the output circuit of said source, said impedance means being connected in series with a load circuit across the output circuit of said source, control means for automatically varying said impedance means according to the load circuit voltage to maintain the load circuit voltage constant during charging of the battery, and means controlled by said meter when the battery is charged a predetermined amount for reducing the charging current and for excluding a portion of the battery and the impedance means from circuit.

16. In a battery control system, a source of charging current, an output circuit for said source, a battery divided into sections and having one section thereof floated between said source and a load circuit, a voltmeter relay operated according to the voltage across the load circuit, means comprising a resistance element connected in the output circuit of said source between the source and said battery section and controlled by said voltmeter relay for maintaining the load circuit voltage constant, variable impedance means and means automatically operated upon failure of the source for connecting the complete battery in series with said impedance means to the load circuit and for controlling the impedance means by said voltmeter relay to maintain the load circuit voltage constant.

17. In a battery control system, a source of charging current, an output circuit for said source, a battery divided into sections and having one section thereof connected between said source and a load circuit, a voltmeter relay operated according to the voltage across the load circuit, means comprising a resistance element connected in the output circuit of said source between the source and said battery section and controlled by said voltmeter relay for maintaining the load circuit voltage constant, variable impedance means, means operated upon failure of the source for connecting the complete battery in series with said impedance means to the load circuit and for controlling the impedance means by the voltmeter relay to maintain the load circuit voltage constant, an ampere hour meter connected between the battery and the load circuit, and means controlled by said ampere hour meter upon energization of said source and when the battery is charged a predetermined amount for reducing the charging current and for excluding a portion of the battery and the impedance means from circuit.

18. In a battery control system, a battery connected to a load circuit, counter electromotive force cells in circuit with said battery, a rheostat, and means responsive to an electrical condition of the load circuit for connecting said rheostat in parallel and in series with said counter electromotive force cells.

19. In a battery control system, a battery connected to a load circuit, counter electromotive force cells in circuit with said battery, a rheostat, and means automatically controlled according to the voltage on the load circuit for connecting said rheostat in parallel and in series with said counter electromotive force cells.

20. In a battery control system, a battery connected to a load circuit, counter electromotive force cells in circuit with said battery, a rheostat, power means for operating said rheostat to vary the resistance thereof, and means automatically controlled according to the voltage on the load circuit for connecting said rheostate in parallel and in series with said counter electromotive force cells and for controlling said power means.

21. In a battery control system, a source of charging current, a battery connected between said source and a load circuit, a power operated rheostat between said battery and the load circuit, means for automatically operating said rheostat according to the load circuit voltage to maintain the load circuit voltage constant, and means automatically operated when the battery is charged to a predetermined point for simultaneously reducing the charging current, excluding all the rheostat from circuit and returning the rheostat to an initial electrical position.

JOEL L. LAREW.
ROBERT P. JUTSON.
WILLIAM H. T. HOLDEN.